Feb. 25, 1964    H. M. EDDE    3,122,189
ONION TOP AND ROOT TRIMMER
Filed May 18, 1961    3 Sheets-Sheet 1
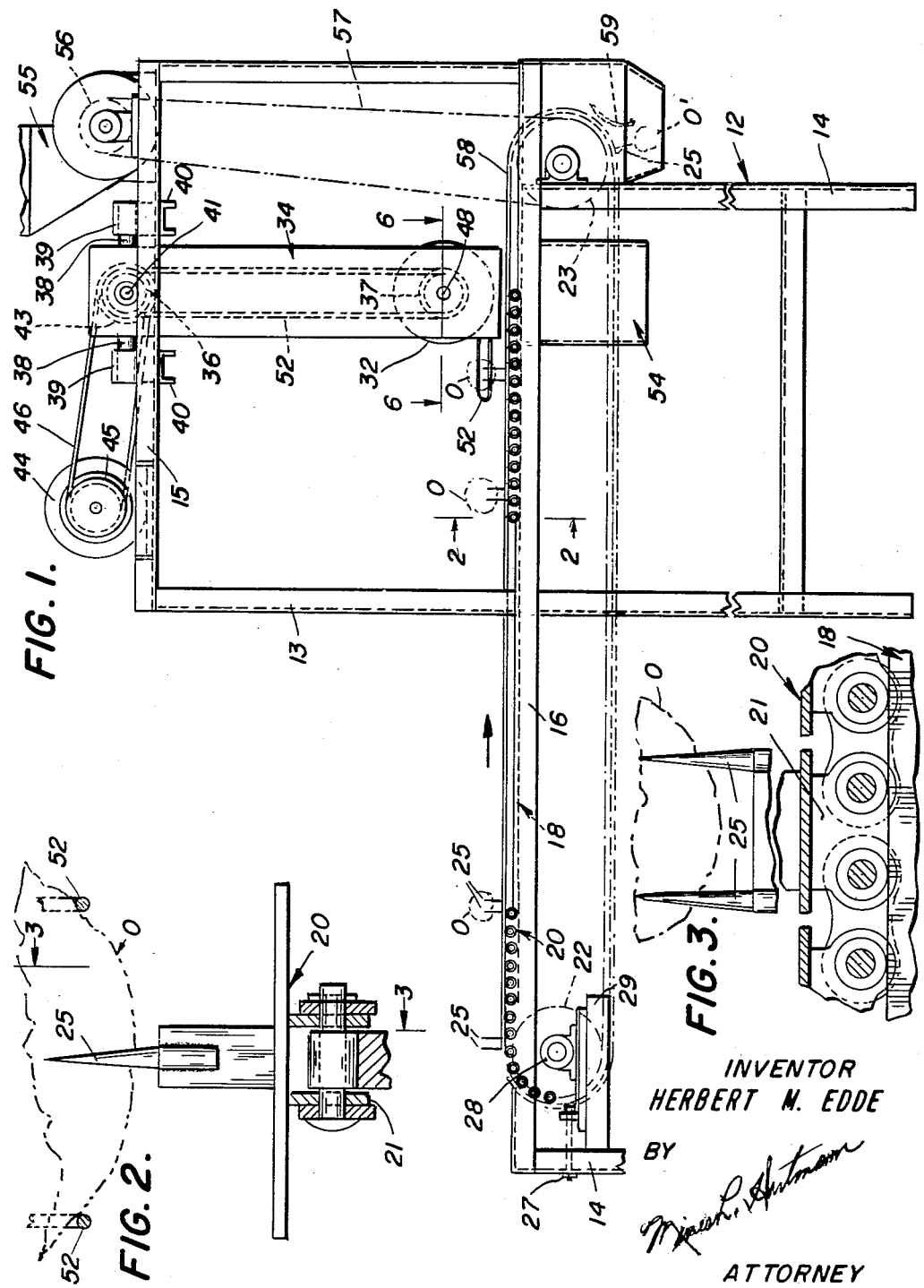
INVENTOR
HERBERT M. EDDE
BY
ATTORNEY

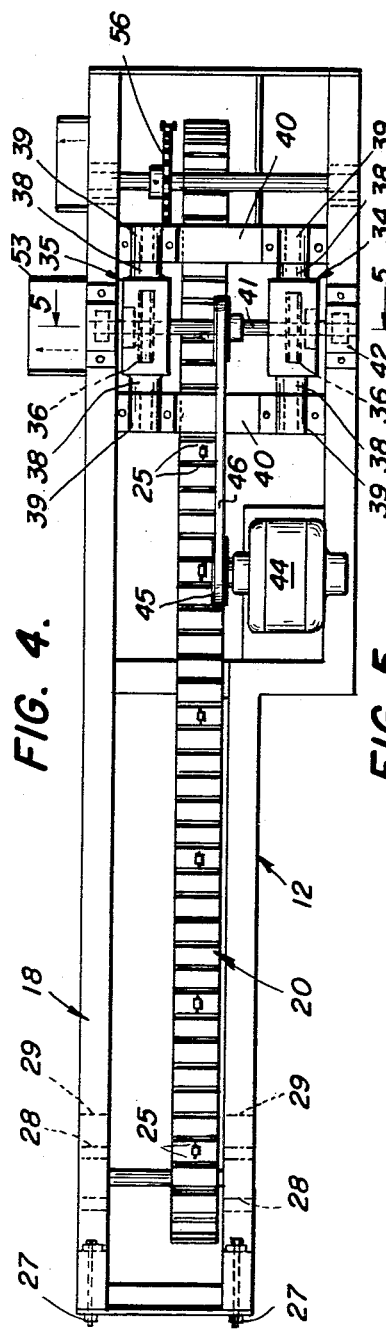
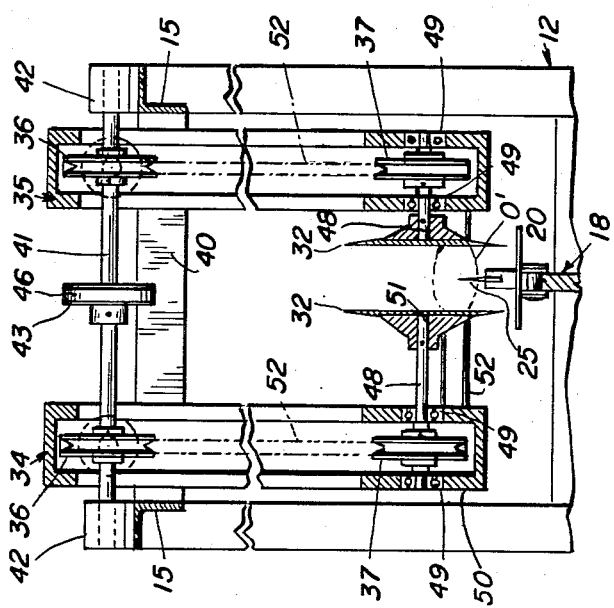
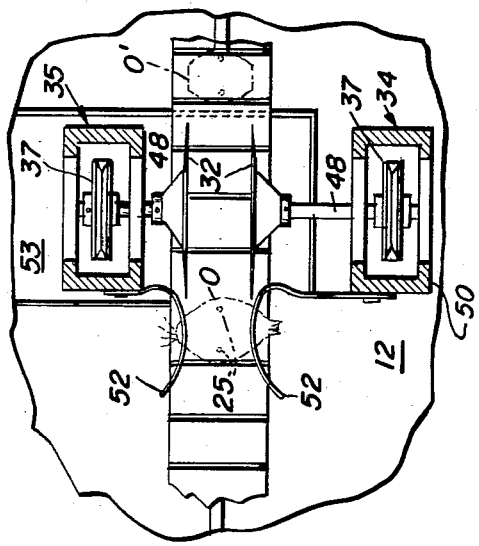

Feb. 25, 1964

H. M. EDDE 3,122,189

ONION TOP AND ROOT TRIMMER

Filed May 18, 1961

INVENTOR
HERBERT M. EDDE
BY
ATTORNEY

United States Patent Office 3,122,189
Patented Feb. 25, 1964

3,122,189
ONION TOP AND ROOT TRIMMER
Herbert M. Edde, Gilroy, Calif., assignor to Consolidated Foods Corporation, a corporation of Maryland
Filed May 18, 1961, Ser. No. 110,942
5 Claims. (Cl. 146—83)

This invention relates to a machine for trimming onions to cut off the top portions and the root portions.

One object of the invention is to provide a machine for simultaneously removing the less desirable onion tops or crowns and the root sections, in preparing onions for subsequent slicing for dehydrating and the like operation. Another object is to provide a machine for trimming an axially oriented onion by passing it between rotary cutters, with automatic means for spacing the cutters apart to accommodate onions of various sizes. Another object is to provide means for rotating rotary cutters mounted at the free end of suspended and laterally movable arms. A further object is to provide means for making successive slices from opposite ends of an oriented onion held on a conveyor means.

These and other objects are attained by my invention which will be understood from the following description, reference being made to the accompanying drawings in which—

FIGURE 1 is a side elevational view of a preferred form of my onion trimming machine;

FIGURE 2 is an enlarged fragmentary cross-sectional view taken on the line 2—2 of FIGURE 1;

FIGURE 3 is a fragmentary elevational view partly in section taken on the line 3—3 of FIGURE 2;

FIGURE 4 is a top plan view of the machine shown in FIGURE 1 with the gear motor omitted for clarity;

FIGURE 5 is an enlarged cross-sectional view taken on the line 5—5 of FIGURE 4;

FIGURE 6 is an enlarged fragmentary plan view partly in section taken on the line 6—6 of FIGURE 1.

Figure 7:
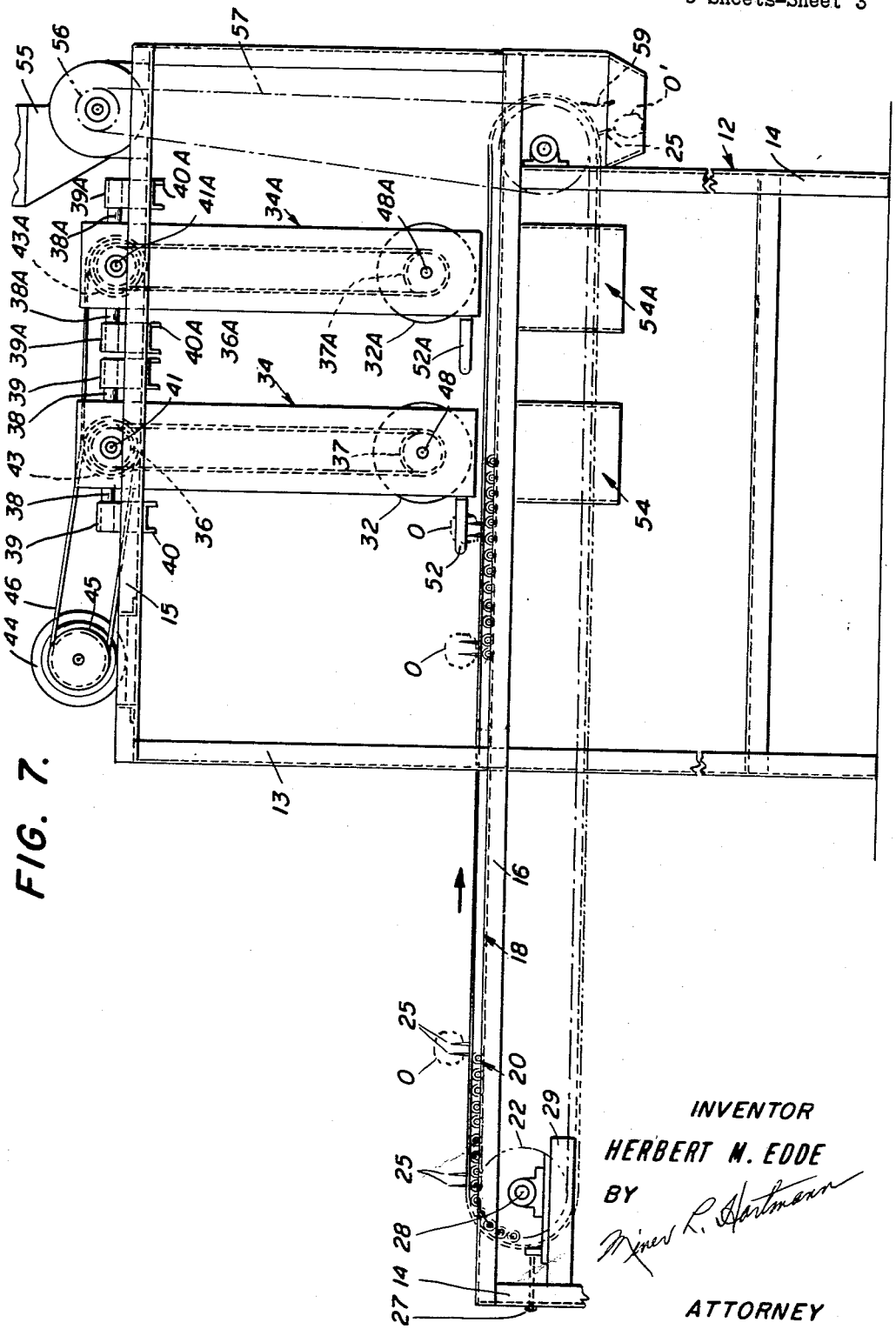
FIGURE 7 is a side elevational view of a form of my machine similar to FIGURE 1 arranged to make a slicing cut of the onion after the root and stem have been cut off.

In the preferred form of trimming machine shown in the drawings, a supporting frame 12 consists generally of vertical members 13 and 14 and horizontal members 15 and 16. The long vertical members 13 and short horizontal members 15 attached at the top thereof form the main frame 12, and the long horizontal members 16 attached at an intermediate position on the vertical members 13 provides a conveyor frame 18 for a chain conveyor system for carrying the onions through the cutting knives. Short vertical members 14 support the conveyor frame 18 at the feed end where a long horizontal run of the conveyor is provided in order to permit placing the onions thereon. The conveyor consists of a link chain 20 extending between sprockets 22 and 23 respectively at the feed and discharge ends of the conveyor. Links 21 of the link chain are provided with a pair of spikes 25 upon which the onions O are impaled to position them with the natural axis of the onion at right angles to the line of motion of the conveyor. A tightening means 27 for the conveyor chain is provided at the feed end sprocket 22, which is mounted in a pair of bearing blocks 28 which are slidably attached to brackets 29 extending forwardly from the vertical members 14, the position of the bearing blocks 28 being adjustable by means of the tightener means 27.

Rotary cutters 32 are operatively mounted on a pair of suspending arms 34 and 35 which are arranged to be movable toward or away from the onions impaled on the spikes 25, depending upon the thickness of the onion, measured along its natural vertical axis, and upon the selected depth of cut for removal of the crown and root sections.

The arms 34 and 35 are hollow, and as shown, are elongated boxes each of which encloses a driver sheave 36 near its upper end, and a driven sheave 37 at its lower end. The box-like arms 34 and 35 are pivoted on trunnions 38 axially disposed parallel to the line of movement of the conveyor, the trunnions being supported on pillow blocks 39 mounted on cross bracket members 40 extending between the two upper horizontal frame members 15. The drive shaft 41 for both arms is mounted in bearing blocks 42 attached to the upper horizontal frame members 15, the shaft 41 being driven through the sheave 43 mounted thereon at a center position, by the motor 44, motor sheave 45, and belt 46, mounted on the main frame 12.

At the lower end of each box-like arm 34 or 35 is mounted a spindle 48 in bearings 49 in the side walls 50 of the arms, the sheave 37 being mounted thereon within the box-like arm, this being actuated from the driver sheave 36 by the drive belt 52. The spindle 48 protrudes inwardly toward the similar spindle 48 of the opposite box-like arm 35 or 34. A rotary cutter 32 is mounted on the protruding end 51 of the spindle 48, the cutter being positioned to cut off either the root section or the crown section of the impaled orientated onions O on the conveyor chain.

Because of the trunnion mounting of the arms 34 and 35, and their relatively great length, the arms may be moved in and out for the necessary distance to selectively trim onions of varying sizes, the arms being positioned by gauging members or feelers 52 attached to the lower ends of the arms 34, 35, at an elevation and lateral position to engage the impaled onion advancing into the cutters 32. The feelers preferably are bifurcated, or formed of looped wires so that the onion is gauged at peripheral positions away from the axis of the onion. Since the crown and the root sections are not globular and protrude for irregular distances beyond the body of the onion, the feelers 52 position the rotary cutters 32 to cut off the desired amount of each individual onion to remove the crown section and the root section, and the trimmed onion, still mounted on the spikes 25, passes over the head end 58 of the conveyor and is removed from the spikes 25 by suitable stripper means 59. The trimmed onions are then dropped into a bin or on to other conveyors (not shown) carrying them to other processing machines. The crown and root trimmings which are cut off by the rotary knives are dropped into waste bins 54 through suitable collecting chutes 53 mounted adjacent the cutters.

The trimmed onions, O' still mounted on the spikes, may be passed through another pair of similar cutters with suspended mountings, to slice off additional slices of selected thicknesses from both ends, the feelers being adjusted to gauge the previously cut surfaces as shown in FIGURE 7.

A second set of rotary cutters 32A are operatively mounted on suspending arms 34A which are arranged to be movable toward or away from the onions impaled on the spikes 25 after the onion has passed through the first set of rotary cutters 32 where the root and crown sections are removed, the feelers 52A being arranged to contact the surfaces of the first cuts and provide for making slices of selected thickness.

The opposed arms 34A are hollow, and as shown, are elongated boxes each of which encloses a driver sheave 36A near its upper end, and a driven sheave 37A at its lower end. The box-like arms 34A are pivoted on trunnions 38A axially disposed parallel to the line of movement of the conveyor, the trunnions being supported on pillow blocks 39A mounted on cross bracket members 40A extending between the two upper horizontal frame members 15. The drive shaft 41A for both arms is mounted in a similar manner as shaft 41, and driven through the sheave 43A which is operatievly connected by a chain belt to a sheave on the shaft 41 of the first set of cutters.

At the lower end of each of the box-like arms 34A is mounted a spindle 48A, and the cutters 32A, arranged and actuated in the same manner as described for the first pair of cutters 32, except that the second pair of cutters makes a parallel-plane slice from each side of the onion.

A gear motor 55 mounted on the main frame 12 actuates the conveyor 20 through the drive sprocket 56 and the drive chain 57.

The manner of operating my trimming machine will be evident from the above description. In the illustrative machine described, the onions are orientated and placed on the spikes by hand, but machine placing of the onions may be employed.

The objectives set forth in the beginning have been attained.

I claim:

1. In an onion slicing machine having a horizontally moving conveyor means adapted to move individual onions held firmly thereon and orientated with their natural axes horizontal and at right angles to the line of travel of said conveyor means; slicing means consisting of a pair of rotary disk slicers disposed to cut off slices at opposite ends of an onion held on said conveyor means; a pivoted suspending arm for each of said slicers whereby said slicers are positioned to slice off selected portions of an onion; driving means for actuating said slicers; a drive shaft including drive sheaves disposed at the upper ends of said arms; motor means for driving said drive shaft; and feeler means associated with each of said arms and positioned to gauge opposite surfaces of each onion on said conveyor prior to its movement into said rotary disk slicers, whereby to slice off a selected portion of each onion.

2. In an onion trimming machine having a horizontally moving conveyor means adapted to move individual onions firmly held thereon and orientated with their natural axes horizontal and at right angles to the line of travel of the conveyor means; trimming means consisting of a pair of rotary disk cutters disposed to cut off slices from the crown end and from the root end of said onions; a pivoted suspending arm for each of said cutters whereby said cutters are positioned to slice off selected portions of an onion adjacent the crown and the root section, the onions being of varying sizes; driving means for actuating said rotary disk cutters; and feeler means mounted on the lower ends of said arms and positioned to gauge each onion on said conveyor prior to its movement into said rotary disk cutters, whereby to slice off the selected crown portion and the selected root core section of each onion.

3. In an onion trimming machine having a horizontally moving conveyor means adapted to move individual onions firmly held thereon and orientated with their natural axes horizontal and at right angles to the line of travel of the conveyor means; trimming means consisting of a pair of rotary disk cutters disposed to cut off slices from the crown end and from the root end of said onions; a pivoted suspending arm for holding each of said cutters whereby said cutters are positioned to slice off selected portions of an onion adjacent the crown and the root section, the onions being of varying sizes; driving means including sheaves and belts associated with said arms for actuating said rotary cutters; a drive shaft including a pair of drive sheaves disposed at the upper ends of said arms; motor means for driving said drive shaft; and feeler means mounted on the lower end of each of said arms and positioned to gauge opposite surfaces of each onion on said conveyor prior to moving it into said rotary cutters, whereby to slice off the selected crown portion and the selected root core section of each onion.

4. In an onion trimming machine having a frame and a horizontal conveyor means adapted to move individual onions held thereon and orientated with their natural axes horizontal and at right angles to the line of travel of the conveyor means, through rotary disk cutters disposed on adjacent opposite ends of said oniions; trimming means consisting of suspending arms for holding and positioning said rotary disk cutters to slice off opposite selected portions of said onions, said arms having trunnions at their upper ends with the axes of said trunnions disposed horizontally and parallel to the line of travel of said conveyor means; driving means including sheaves and belts associated with said arms for actuating said rotary disk cutters; a drive shaft including a pair of drive sheaves disposed at the upper ends of said arms and mounted in bearings attached to said frame, the axis of said drive shaft being at substantially the same elevation as the axes of said trunnions; and motor means for driving said drive shaft.

5. In an onion slicing machine having a frame and a horizontally moving conveyor means adapted to move individual trimmed onions impaled thereon through rotary disk cutters disposed to cut off slices at opposite faces of said onions; slicer means consisting of trunnion supported suspending arms for holding and positioning said cutters to slice off opposite selected portions of said onions; the axes of said trunnions being disposed horizontally and parallel to the line of travel of the onions on said conveyor; driving means including sheaves and belts associated with said arms for actuating said rotary disk cutters; a drive shaft including drive sheaves disposed at the upper ends of said arms mounted in bearings attached to said frame, the axis of said drive shaft being at substantially the same elevation as the axes of said trunnions; means for driving said drive shaft, and feeler gauges associated with each of said arms and positioned to gauge opposite surfaces of each onion on said conveyor prior to moving it into said rotary disk cutters.

References Cited in the file of this patent

UNITED STATES PATENTS

| 2,494,914 | Urschel et al. | Jan. 17, 1950 |
| 2,625,781 | Tateyama | Jan. 20, 1953 |
| 2,801,662 | Brunnier | Aug. 6, 1957 |
| 2,818,899 | De Back | Jan. 7, 1958 |
| 2,961,023 | Boyer | Nov. 22, 1960 |
| 2,974,699 | Boles et al. | Mar. 14, 1961 |

FOREIGN PATENTS

| 650,653 | Great Britain | Feb. 28, 1951 |